United States Patent
Matsukawa

(10) Patent No.: US 6,281,645 B1
(45) Date of Patent: Aug. 28, 2001

(54) MOTOR CONTROL SYSTEM AND IMAGE FORMING APPARATUS USING THE SAME

(75) Inventor: Keiichi Matsukawa, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/440,634

(22) Filed: Nov. 16, 1999

(30) Foreign Application Priority Data

Nov. 17, 1998 (JP) .................................................. 10-326865

(51) Int. Cl.[7] .................................................. H02P 5/46
(52) U.S. Cl. .............................. 318/112; 318/34; 318/51; 318/53; 318/111; 318/113
(58) Field of Search ............... 318/34–113; 705/402–408

(56) References Cited

U.S. PATENT DOCUMENTS

| | | | |
|---|---|---|---|
| 4,295,198 | * 10/1981 | Copeland et al. | 364/515 |
| 4,605,080 | * 8/1986 | Lemelson | 177/4 |
| 4,853,602 | * 8/1989 | Hommes et al. | 318/38 |
| 4,918,365 | * 4/1990 | Tanuma et al. | 318/685 |
| 5,130,710 | * 7/1992 | Salazar | 341/11 |
| 5,331,539 | * 7/1994 | Pfeifer et al. | 364/140 |
| 5,583,410 | 12/1996 | Jacobson et al. | 318/696 |
| 5,739,648 | * 4/1998 | Ellis et al. | 318/112 |

FOREIGN PATENT DOCUMENTS

| | | |
|---|---|---|
| 39 15 482 A1 | 11/1990 | (DE) . |
| 09239962 | 9/1997 | (EP) . |

* cited by examiner

*Primary Examiner*—Bentsu Ro
*Assistant Examiner*—Rita Leykin
(74) *Attorney, Agent, or Firm*—Nixon Peabody LLP; Donald R. Studebaker

(57) ABSTRACT

A motor control system includes a processor having a clock output terminal for outputting clock pulses in desired cycles, a plurality of motors, and a plurality of motor drivers which are provided one for each motor and drive the corresponding motors on the basis of the clock pulses input into the motor drivers through their respective clock input terminals. The clock input terminals of the motor drivers are connected to the clock output terminal of the processor in common with each other.

7 Claims, 7 Drawing Sheets

MOTOR CONTROL SYSTEM AND IMAGE FORMING APPARATUS USING THE SAME

BACKGROUND OF THE INVENTION

1. Field of the Invention

This invention relates to a motor control system, and more particularly to a motor control system in which a plurality of electric motors can be controlled by a single MPU (microprocessor unit). This invention further relates to an image forming apparatus using such a motor control system.

2. Description of the Related Art

FIG. 7 shows a typical conventional motor control circuit. Motor control circuits using a MPU 50 are broadly divided into a constant-current system motor control circuit and a constant-voltage system motor control circuit. The motor control circuit shown in FIG. 7 is of a constant-current system. In the motor control circuit, pulse motors PM (PM1, PM2 and PM3) are driven under the control of control signals which are respectively input into drivers 51 (driver 1, driver 2 and driver 3) each having a clock terminal CLK (CLK1, CLK2, CLK3) through which a clock for controlling the rotating speed of the motor is input, an enabling terminal ENB (ENB1, ENB2, ENB3) for controlling whether the motor is to be rotated, and a clockwise/counterclockwise terminal CW/CCW (CW/CCW1, CW/CCW2, CW/CCW3).

As shown in FIG. 7, when a plurality of pulse motors PM1 to PM3 are controlled by a single MPU 50, control signals for the respective motors PM1 to PM3 are discretely connected to the MPU 50.

When the MPU 50 has a built-in clock generation means such as an integrated timer controller ITC, pulse motors more than the number of channels which the built-in integrated timer controller ITC can use cannot be controlled unless an additional integrated timer controller 52 is provided. For example, in the example shown in FIG. 7, the third motor PM3 is controlled by the additional integrated timer controller 52.

Such an additional integrated timer controller adds to cost and requires an additional space on the circuit board, which adds to the size of the circuit board.

Generally the MPU 50 is provided with an integrated timer controller ITC having a plurality of channels. When the MPU 50 is incorporated in an apparatus having various mechanisms and processing means (e.g., an image forming apparatus to be described later), all the channels of the integrated timer controller cannot be used for controlling the motors but a part of the channels must be used for controlling other mechanisms and/or the processing means in the apparatus, which gives rise to the aforesaid problem.

For example, in a stencil printer as an example of the image forming apparatus, the number of objects to be controlled by the MPU has been increasing as the number of automated functions of the printer is increased. For example, in the current stencil printer, a large number of motors including those for adjusting the printing position on the printing paper in the longitudinal direction and the transverse direction, for supplying printing papers, and discharging printing papers are incorporated.

Though a plurality of MPU's have been incorporated in the current stencil printer by the function, increasing objects to be controlled has come to require additional integrated timer controllers.

SUMMARY OF THE INVENTION

In view of the foregoing observations and description, the primary object of the present invention is to provide a motor control system which can control motors larger in number than the number of the channels of the timer controller for generating clocks without increasing a timer controller.

Another object of the present invention is to provide an image forming apparatus employing such a motor control system.

In accordance with a first aspect of the present invention, there is provided a motor control system comprising a processor having a clock output terminal for outputting clock pulses in desired cycles, a plurality of motors, and a plurality of motor drivers which are provided one for each motor and drive the corresponding motors on the basis of the clock pulses input into the motor drivers through respective clock input terminals thereof, wherein the improvement comprises that the clock input terminals of the motor drivers are connected to the clock output terminal of the processor in common with each other.

In one embodiment of the present invention, the processor outputs an enabling signal exclusively to one of the motor drivers, thereby enabling said one motor driver to start driving the corresponding motor.

In another embodiment, the processor outputs an enabling signal to two or more of the motor drivers at one time, thereby enabling the motor drivers to start driving the corresponding motors.

In accordance with a second aspect of the present invention, there is provided a motor control system comprising a processor having first and second clock output terminals and a plurality of enabling signal output terminals, the first and second clock output terminals outputting first and second clock pulses in desired cycles and in phases different from each other by a predetermined amount, a plurality of motors, and a plurality of motor drivers which are provided one for each motor and drive the corresponding motors in a constant-voltage drive mode on the basis of the first and second clock pulses input into the motor drivers from the first and second clock output terminals through first and second clock input terminals of each of the motor drivers and the enabling signals selectively input into the motor drivers through the enabling signal output terminals of the processor, wherein the improvement comprises that the first clock input terminals of the motor drivers are connected to the first clock output terminal of the processor in common with each other, and the second clock input terminals of the motor drivers are connected to the second clock output terminal of the processor in common with each other.

In accordance with a third aspect of the present invention, there is provided a motor control system comprising a processor having a clock output terminal, a plurality of enabling signal output terminals, and a plurality of rotating direction signal output terminals, the clock output terminal outputting clock pulses in desired cycles, a plurality of motors, and a plurality of motor drivers which are provided one for each motor and drive the corresponding motors in a constant-current drive mode on the basis of the clock pulses input into the motor drivers from the clock output terminals through a clock input terminal of each of the motor drivers and the enabling signals and the rotating direction output signals selectively input into the motor drivers respectively through the enabling signal output terminals and the rotating direction output terminals of the processor, wherein the improvement comprises that the clock input terminals of the motor drivers are connected to the clock output terminal of the processor in common with each other.

In accordance with a fourth aspect of the present invention, there is provided an image forming apparatus which is for forming an image on a printing paper and is provided with a plurality of motors and a motor control system for controlling the motors, the motor control system comprising a processor having a clock output terminal for outputting clock pulses in desired cycles, and a plurality of motor drivers which are provided one for each motor and drive the corresponding motors on the basis of the clock pulses input into the motor drivers through respective clock input terminals thereof, wherein the improvement comprises that the clock input terminals of the motor drivers are connected to the clock output terminal of the processor in common with each other.

The motors may be, for instance, those for adjusting the position on the printing paper in which the image is to be formed.

In accordance with the present invention, since a plurality of motor drivers use one channel of an integrated timer controller of the processor in common with each other, more motors than the number of the available channels of the integrated timer controller can be controlled by the processor without increasing an integrated timer controller.

DESCRIPTION OF THE PREFERRED EMBODIMENTS

Figure 1:
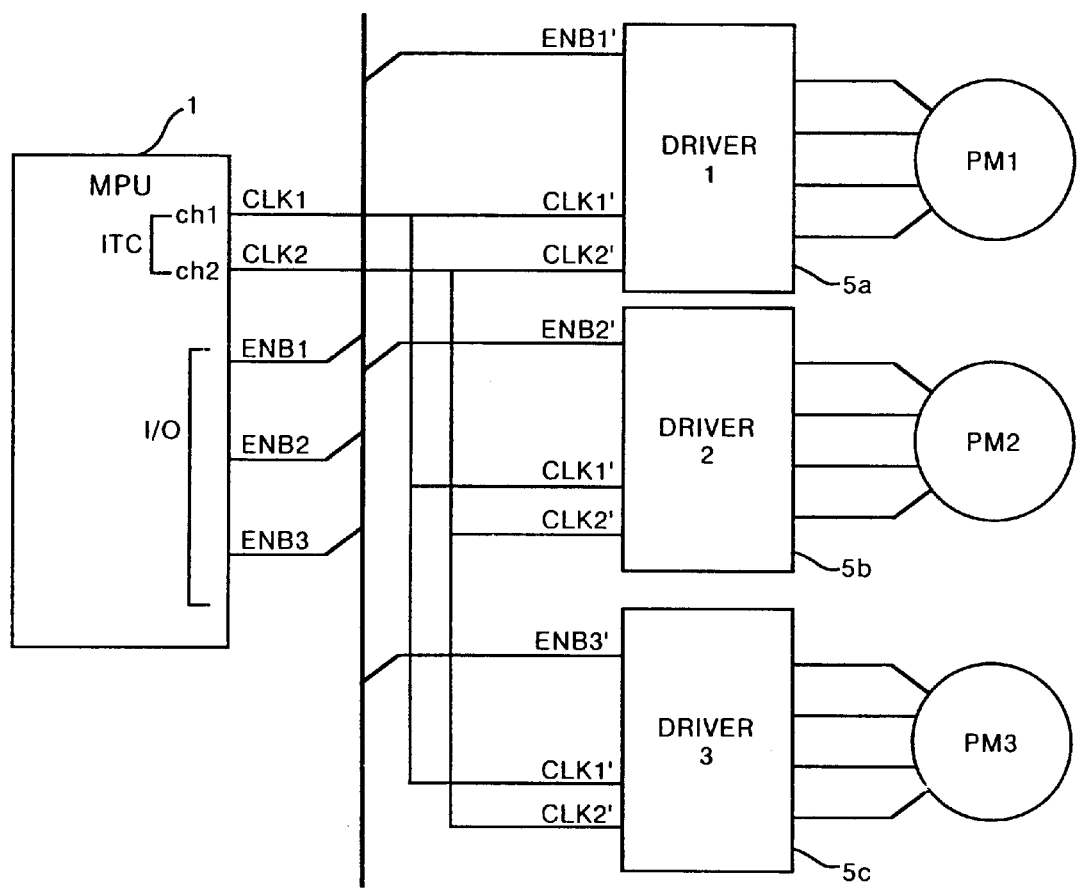
FIG. 1 is a block diagram showing a motor control system in accordance with a first embodiment of the present invention.

FIG. 1 shows a motor control system in accordance with a first embodiment of the present invention which drives a plurality of electric motors in a constant-voltage drive mode.

In FIG. 1, an MPU 1 has a three-channel input-output unit I/O and a two-channel integrated timer controller ITC and controls three pulse motors PM1 to PM3 by way of first to third motor drivers 5a to 5c.

The motor drivers 5a to 5c are respectively provided with enabling signal input terminals ENB1' to ENB3' and the enabling signal input terminals ENB1' to ENB3' are separately connected to enabling signal output terminals ENB1 to ENB3 of the input-output unit I/O of the MPU 1.

The integrated timer controller ITC of the MPU 1 has first and second clock output terminals CLK1 and CLK2. Each of the motor drivers 5a to 5c is provided with first and second clock input terminals CLK1' and CLK2'. The first clock input terminals CLK1' of the respective motor drivers 5a to 5c are connected to the first clock output terminal CLK1 of the integrated timer controller ITC of the MPU 1 in common with each other and the second clock input terminals CLK2' of the respective motor drivers 5a to 5c are connected to the second clock output terminals CLK2 of the integrated timer controller ITC of the MPU 1 in common with each other.

The first and second clock output terminals CLK1 and CLK2 output clock pulses which are the same in frequency and different in phase by a predetermined amount (90°) from each other.

The MPU 1 selectively inputs an enabling signal to one or more of the motor drivers 5a to 5c and only the motor driver(s) which receives the enabling signal is selectively operated. The selected motor driver(s) drives the corresponding pulse motor(s) at a speed corresponding to the clock pulses output from the clock output terminal CLK1 or CLK2 in the direction (clockwise direction or counterclockwise direction) corresponding to the phase difference between the clock pulses output from the first and second clock output terminals CLK1 and CLK2, that is, depending on which is output earlier.

When the enabling signal is input into one of the motor drivers 5a to 5c, only the pulse motor corresponding to the motor driver which receives the enabling signal is exclusively driven. (exclusive control)

When the enabling signal is input into two or more motor drivers, the pulse motors corresponding to the motor drivers which receive the enabling signal are all driven at the same speed in the same direction. (simultaneous control)

In the case of the simultaneous control, the mechanisms to be driven by the pulse motors can be moved at different speeds even if the rotating speeds of the pulse motors are the same by inserting a gear mechanism between the pulse motor and the mechanism to be driven by the pulse motor.

Figure 2:
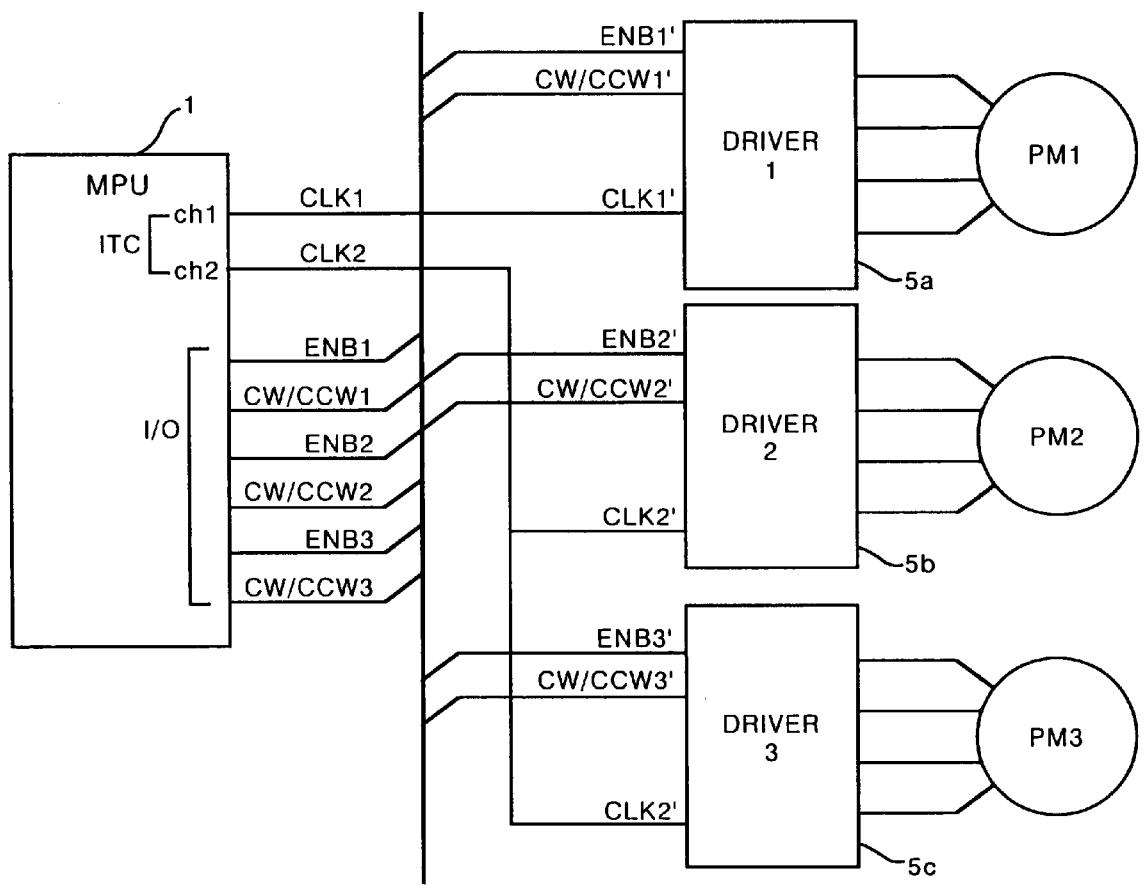
FIG. 2 is a block diagram showing a motor control system in accordance with a second embodiment of the present invention.

FIG. 2 shows a motor control system in accordance with a second embodiment of the present invention which drives a plurality of electric motors in a constant-current drive mode.

In FIG. 2, an MPU 1 has a three-channel input-output unit I/O and a two-channel integrated timer controller ITC and controls three pulse motors PM1 to PM3 by way of first to third motor drivers 5a to 5c.

The motor drivers 5a to 5c are respectively provided with enabling signal input terminals ENB1' to ENB3' and the enabling signal input terminals ENB1' to ENB3' are separately connected to enabling signal output terminals ENB1 to ENB3 of the input-output unit I/O of the MPU 1. Further the motor drivers 5a to 5c are respectively provided with rotating direction signal input terminals CW/CCW1' to CW/CCW3' and the enabling signal input terminals CW/CCW1' to CW/CCW3' are separately connected to rotating direction signal output terminals CW/CCW1 to CW/CCW3 of the input-output unit I/O of the MPU 1.

The integrated timer controller ITC of the MPU 1 has first and second clock output terminals CLK1 and CLK2. The first motor driver 5a is provided with a single clock input terminal CLK1' and each of the second and third motor drivers 5b and 5c is provided with a single clock input terminal CLK2'. The clock input terminal CLK1' of the first motor driver 5a is connected to the first clock output terminal CLK1 of the integrated timer controller ITC of the MPU 1 separately from the clock input terminals CLK2 of the second and third motor drivers 5b and 5c, whereas the clock input terminals CLK2' of the second and third motor drivers 5b and 5c are connected to the second clock output terminal CLK2 of the integrated timer controller ITC of the MPU 1 in common with each other.

With this arrangement, the pulse motor PM1 driven by the first motor driver 5a is controlled independently of the second and third pulse motors PM2 and PM3, whereas pulse motors PM2 and PM3 driven by the second and third motor drivers 5b and 5c use the single second clock output terminal CLK2 of the MPU 1 in common with each other.

However the directions of rotation of the pulse motors PM2 and PM3 can be independently controlled by the rotating direction signals input from the rotating direction signal output terminals CW/CCW2 and CW/CCW3, and also whether the pulse motors PM2 and PM3 are rotated or stopped can be independently controlled by the enabling signals input from the enabling signal output terminals ENB2 and ENB3.

A stencil printer 10 in accordance with a third embodiment of the present invention, where a motor control system of the present invention is employed, will be described with reference to FIGS. 3A and 3B, hereinbelow.

Figure 3A:
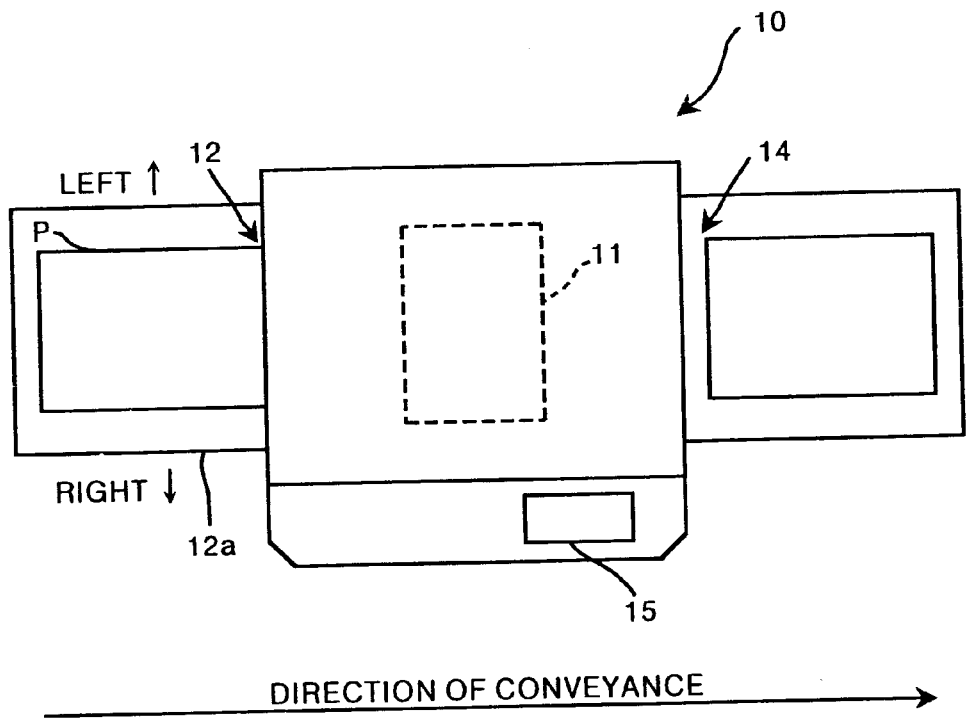
FIG. 3A is a plan view of a stencil printer provided with a motor control system in accordance with the present invention.
Figure 3B:
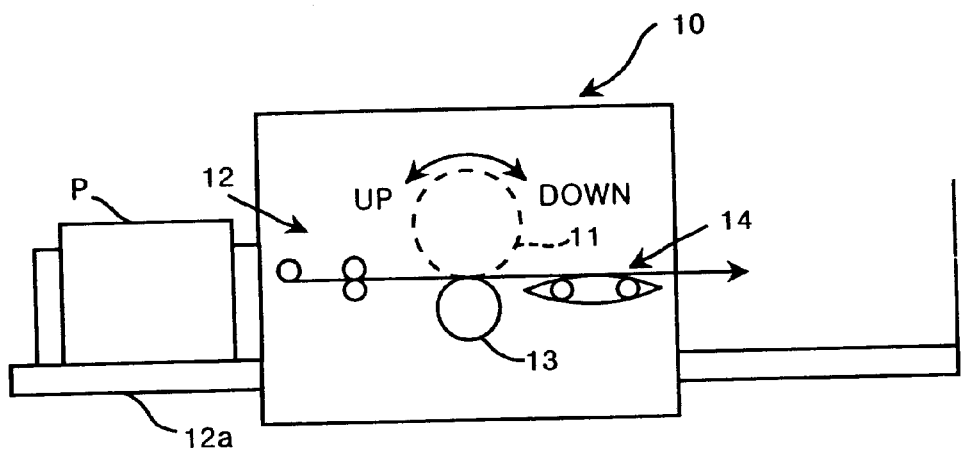
FIG. 3B is a front view of the stencil printer.

In FIGS. 3A and 3B, the stencil printer 10 has a printing drum 11 around which a stencil master (not shown) is wound. A squeegee roller (not shown) which is in contact with the inner surface of the peripheral wall of the printing drum 11 and a doctor roller which supplies printing ink to the squeegee roller are provided inside the printing drum 11. A press roller 13 is disposed just below the printing drum 11 to be movable up and down between an operative position in which it abuts against the outer peripheral surface of the printing drum 11 and a retracted position in which it is away from the outer peripheral surface of the printing drum 11.

The printing drum 11 is rotated in the counterclockwise direction as seen in FIG. 3B. A paper supply table 12a on which a plurality of printing papers P are stacked is disposed on the left side of the printing drum 11. A scraper unit 12 which feeds out the printing papers P one by one toward the printing drum 11 from the paper supply table 12a is disposed above the paper supply table 12a.

A paper discharge portion 14 comprising a conveyor belt which conveys printed papers P separated from the printing drum 11 and a paper discharge table on which the printed papers P conveyed by the conveyor belt are stacked is disposed on the right side of the printing drum 11.

The stencil printer 10 is provided with a longitudinal printing position adjustment mechanism and a transverse printing position adjustment mechanism. The longitudinal printing position adjustment mechanism adjusts the position of the stencil master on the printing drum 11 relative to the printing paper P in the longitudinal direction thereof (the direction of conveyance of the printing paper P), and the transverse printing position adjustment mechanism adjusts the position of the stencil master on the printing drum 11 relative to the printing paper P in the transverse direction thereof (a direction perpendicular to the direction of conveyance of the printing paper P). The longitudinal and transverse printing position adjustment mechanisms are driven by electric motors and are operated before the printing step. These motors may be controlled by the motor control system similar to the second embodiment shown in FIG. 2. The motor for the longitudinal printing position adjustment mechanism will be referred to as "the longitudinal position adjustment pulse motor PM2" and the motor for the transverse printing position adjustment mechanism will be referred to as "the transverse position adjustment pulse motor PM3", hereinbelow.

Adjustment of the position of the stencil master relative to the printing paper P in the longitudinal direction (upward or downward) is made by driving the longitudinal position adjustment pulse motor PM2 to change the angular position of the printing drum 11 relative to the printing paper P which is supplied to the printing drum 11 at a predetermined timing.

Adjustment of position of the stencil master relative to the printing paper P in the transverse direction (rightward or leftward) is made by driving the transverse position adjustment pulse motor PM3 to displace the paper supply table 12a rightward or leftward relatively to the printing drum 11.

Figure 4:
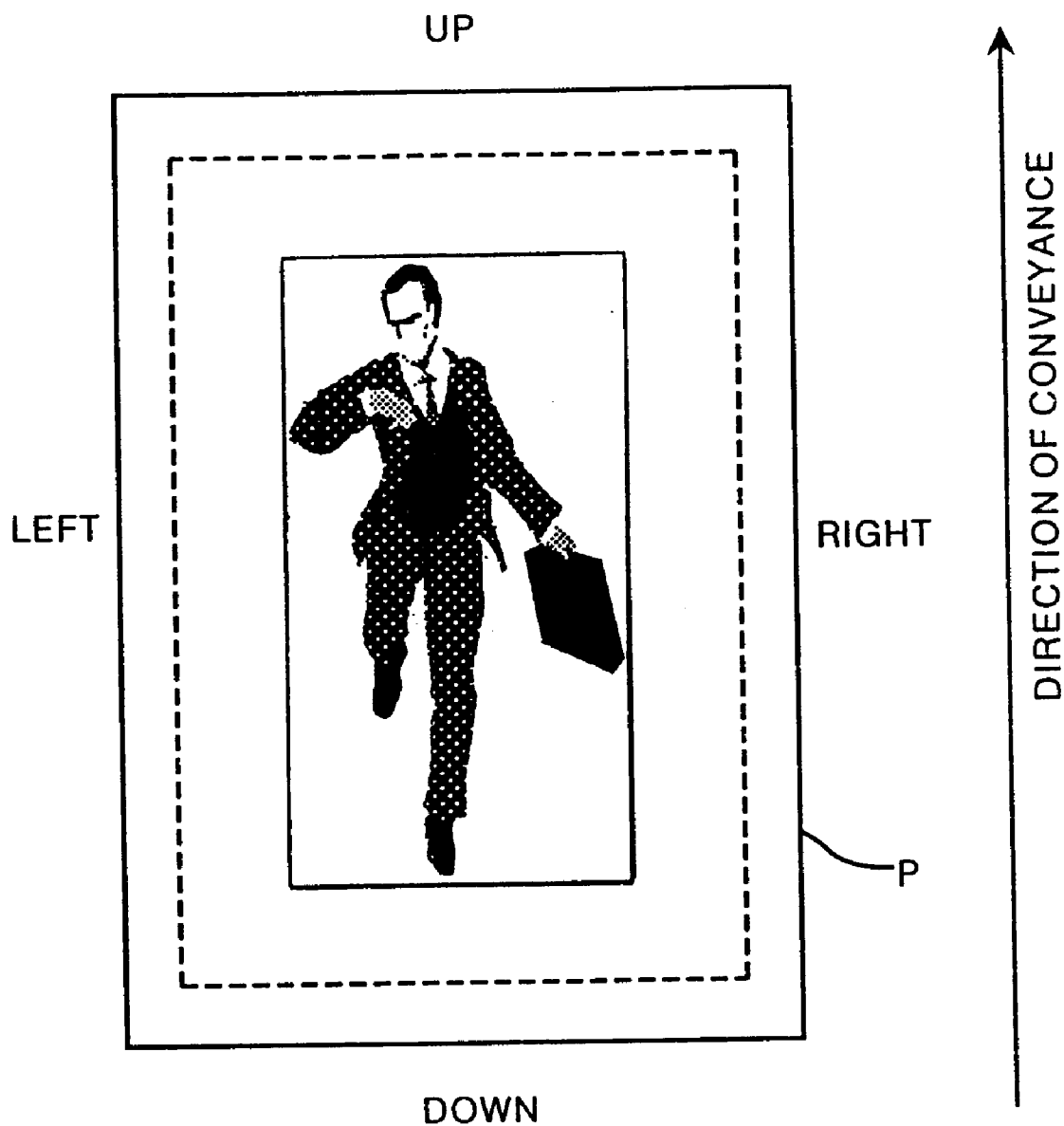
FIG. 4 is a view for illustrating adjustment of the printing position on the printing paper.

In FIG. 4, the area circumscribed by the broken line represents the effective image area on the stencil master. In the adjustment of the stencil master relative to the printing paper P in the longitudinal direction, the effective area is shifted upward or downward, and in the adjustment of the stencil master relative to the printing paper P in the transverse direction, the effective area is shifted rightward or leftward.

Figure 5:
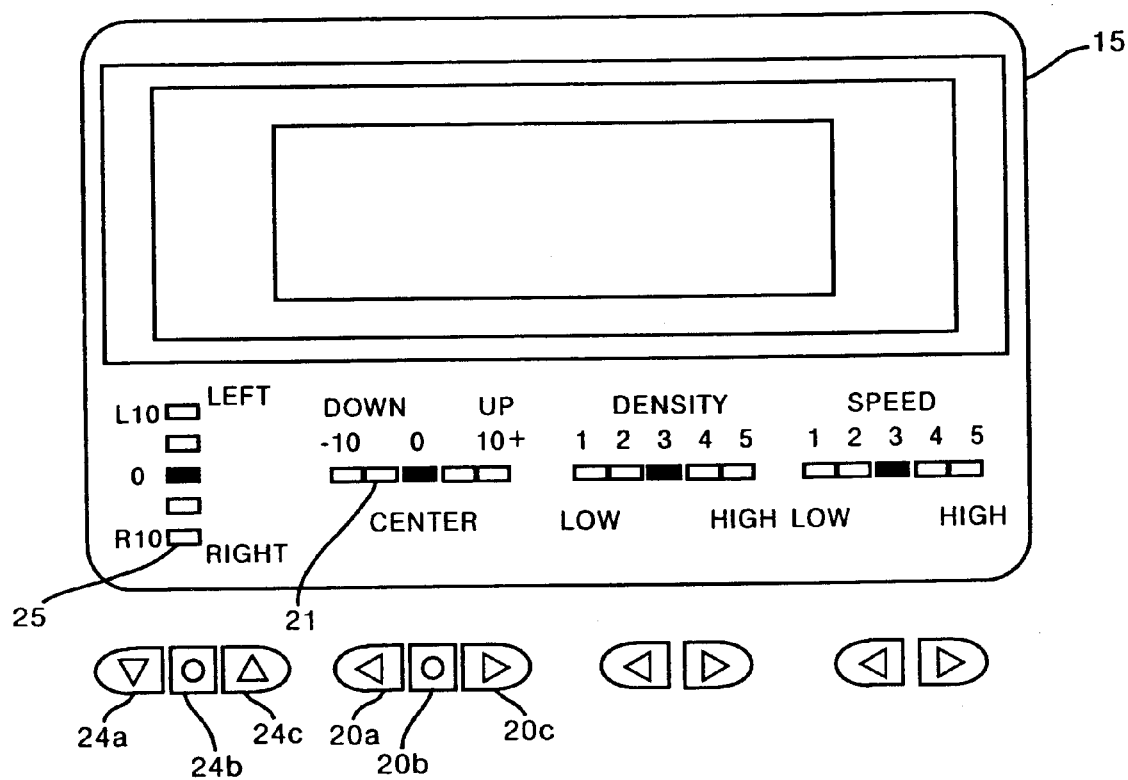
FIG. 5 is a view showing the control panel of the stencil printer.

The operator carries out the printing position adjustment by operating longitudinal position adjustment keys 20a to 20c and transverse position adjustment keys 24a to 24c on the control panel 15 of the stencil printer 10 shown in FIG. 5.

When the key 20a is pushed, the longitudinal position adjustment pulse motor PM2 is rotated in the counterclockwise direction to shift upward the effective image area relatively to the printing paper P, and when the key 20c is pushed, the pulse motor PM2 is rotated in the clockwise direction to shift downward the effective image area relatively to the printing paper P. An LED display 21 shows the selected position. When the key 20b is pushed, the effective image area is centered. The key 20b will be sometimes referred to as "the centering key 20b".

When the key 24a is pushed, the transverse position adjustment pulse motor PM3 is rotated in the counterclockwise direction to shift leftward the effective image area relatively to the printing paper P, and when the key 24c is pushed, the pulse motor PM3 is rotated in the clockwise direction to shift rightward the effective image area relatively to the printing paper P. An LED display 25 shows the selected position. When the key 24b is pushed, the effective image area is centered. The key 24b will be sometimes referred to as "the centering key 24b".

In this particular embodiment, the MPU 1 (FIG. 2) has a four-channel integrated timer controller ITC. Two of the four channels of the integrated timer controller ITC are used for a counter, a timer and the like for performing printing operation, another channel of the integrated timer controller ITC is used for driving a pulse motor of another mechanism. The other channel of the integrated timer controller ITC, that is, the clock output terminal CLK2 is used by the longitudinal position adjustment pulse motor PM2 and the transverse position adjustment pulse motor PM3 in common with each other.

Thus, three pulse motors can be controlled by only two channels of the integrated timer controller ITC without use of an additional integrated timer controller ITC.

Figure 6:
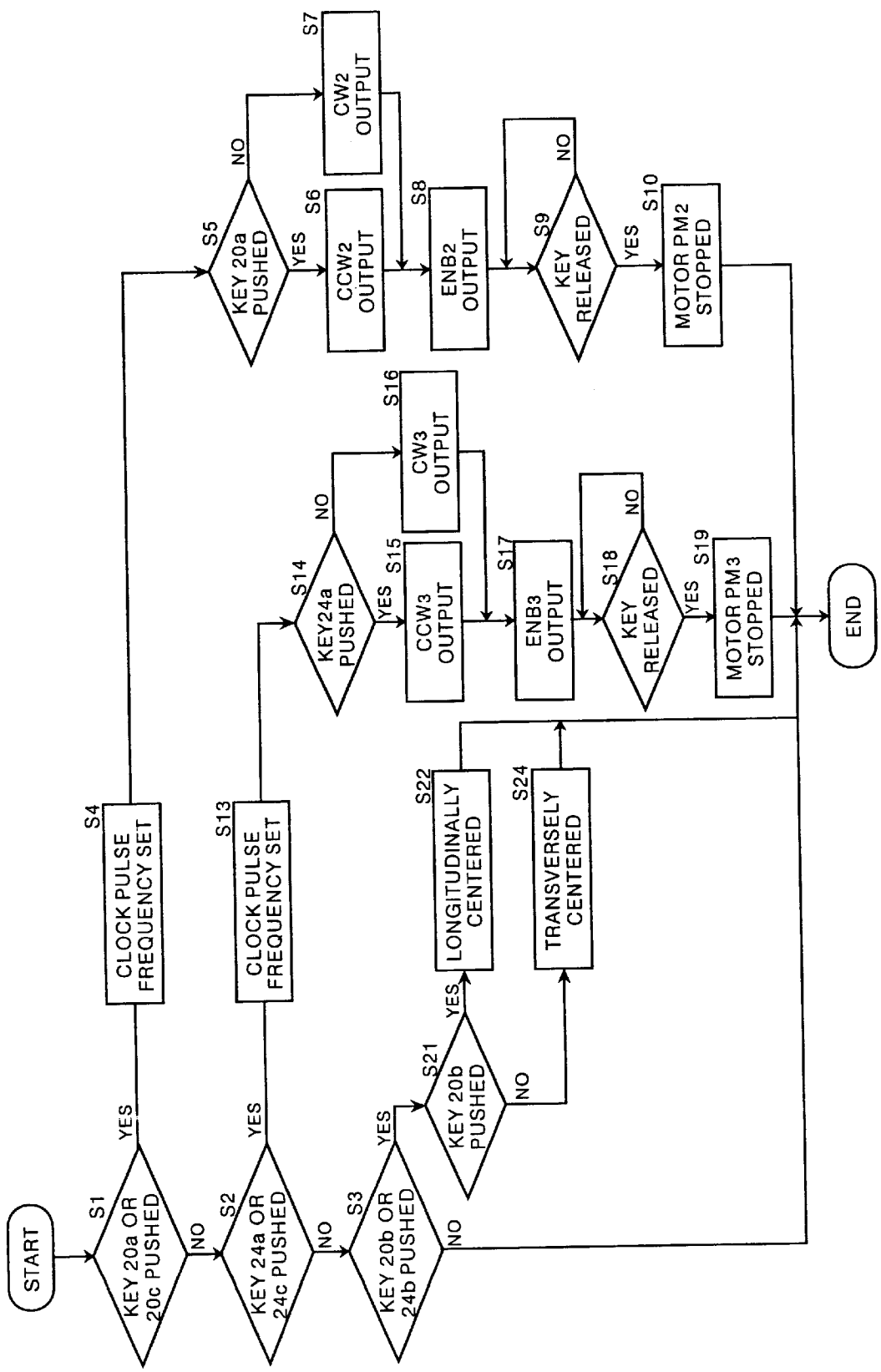
FIG. 6 is a flow chart for illustrating the processing of adjusting the printing position on the printing paper.
Figure 7:
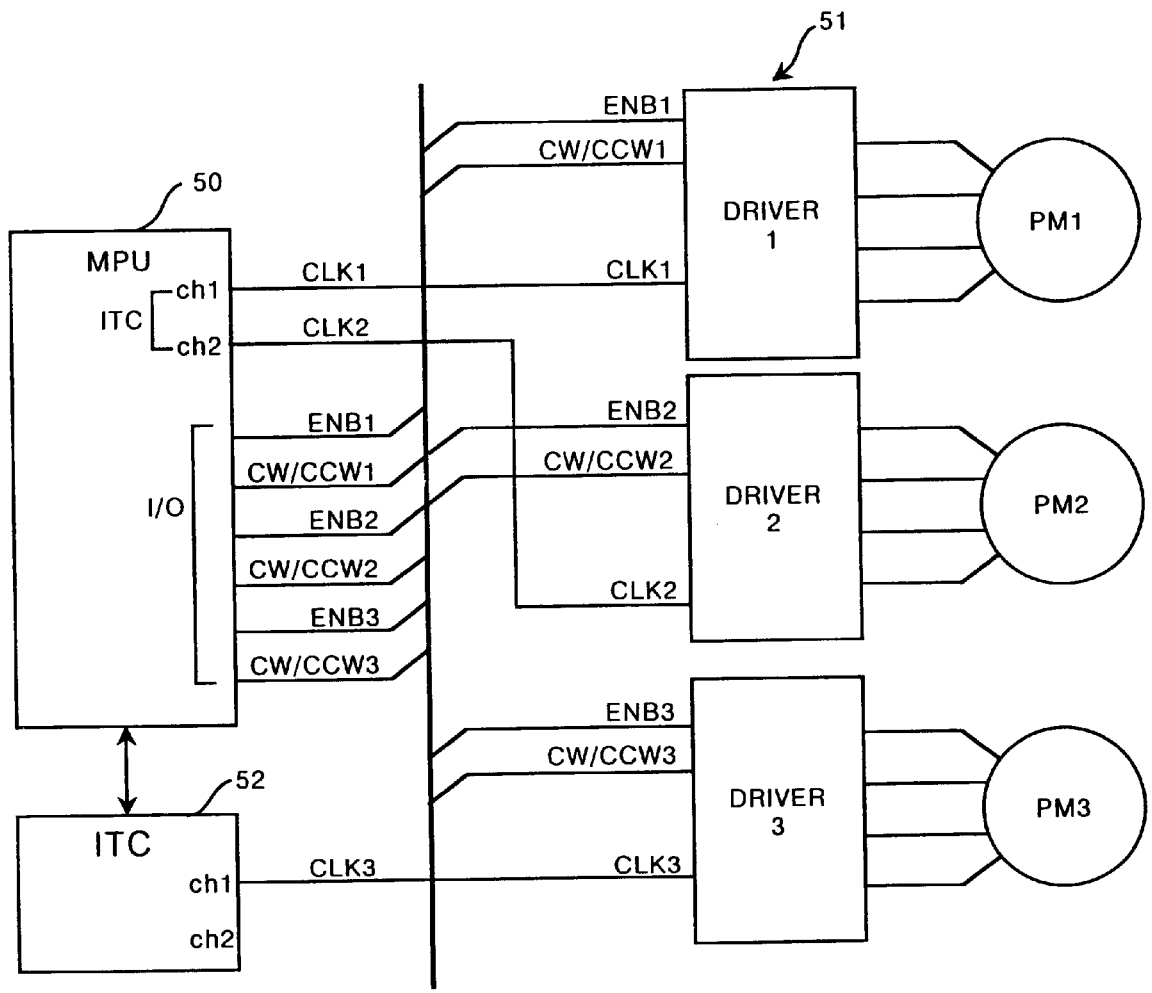
FIG. 7 is a block diagram showing a conventional motor control system.

FIG. 6 shows a flow chart of interruption handling routine for executing the longitudinal printing position adjustment and the transverse printing position adjustment. In this flow chart, one of the pulse motors PM2 and PM3 is driven at one time. (exclusive control)

That is, operation of the longitudinal position adjustment keys 20a to 20c and operation of the transverse position adjustment keys 24a to 24c are alternately allowed and are not simultaneously allowed.

When one of the longitudinal position adjustment keys 20a and 20c is pushed (when the answer to the question in step S1 is YES), the MPU 1 outputs through the clock output terminal CLK2 clock pulses at a frequency suitable for rotating the longitudinal position adjustment pulse motor PM2 at a predetermined speed. (step S4)

Then it is determined whether the key 20a has been pushed. (step S5) When it is determined that the key 20a has been pushed (when the answer to the question in step S5 is YES), the MPU 1 outputs a rotating direction signal CCW2, representing that the position adjustment pulse motor PM2 is to be rotated in the counterclockwise direction, through the rotating direction signal output terminals CW/CCW2 (step S6) and outputs an enabling signal through the enabling signal output terminal ENB2 (step S8).

Upon receipt of the rotating direction signal CCW2 and the enabling signal, the second motor driver 5b rotates the longitudinal position adjustment pulse motor PM2 in the counterclockwise direction until the key 20a is released. When the key 20a is released (when the answer to the question in step S9 is YES), the enabling signal is made ineffective and the longitudinal position adjustment pulse motor PM2 is stopped. (step S10)

When it is determined in step S5 that the key 20c has been pushed (when the answer to the question in step S5 is NO), the MPU 1 outputs a rotating direction signal CW2, representing that the position adjustment pulse motor PM2 is to be rotated in the clockwise direction, through the rotating direction signal output terminals CW/CCW2 (step S7) and outputs an enabling signal through the enabling signal output terminal ENB2 (step S8).

Upon receipt of the rotating direction signal CW2 and the enabling signal, the second motor driver 5b rotates the longitudinal position adjustment pulse motor PM2 in the clockwise direction until the key 20c is released. When the key 20c is released (when the answer to the question in step S9 is YES), the enabling signal is made ineffective and the longitudinal position adjustment pulse motor PM2 is stopped. (step S10)

The amount of adjustment in the longitudinal direction is shown by the LED display 21 and is stored in the MPU 1.

When one of the transverse position adjustment keys 24a and 24c is pushed (when the answer to the question in step S1 is NO and the answer to the question in step S2 is YES), the MPU 1 outputs through the clock output terminal CLK2 clock pulses at a frequency suitable for rotating the transverse position adjustment pulse motor PM3 at a predetermined speed. (step S13)

Then it is determined whether the key 24a has been pushed. (step S14) When it is determined that the key 24a has been pushed (when the answer to the question in step S14 is YES), the MPU 1 outputs a rotating direction signal CCW3, representing that the position adjustment pulse motor PM3 is to be rotated in the counterclockwise direction, through the rotating direction signal output terminals CW/CCW23(step S15) and outputs an enabling signal through the enabling signal output terminal ENB3 (step S17).

Upon receipt of the rotating direction signal CCW3 and the enabling signal, the third motor driver 5c rotates the transverse position adjustment pulse motor PM3 in the counterclockwise direction until the key 24a is released. When the key 24a is released (when the answer to the question in step S18 is YES), the enabling signal is made ineffective and the transverse position adjustment pulse motor PM3 is stopped. (step S19)

When it is determined in step S5 that the key 24c has been pushed (when the answer to the question in step S14 is NO), the MPU 1 outputs a rotating direction signal CW3, representing that the position adjustment pulse motor PM2 is to be rotated in the clockwise direction, through the rotating direction signal output terminals CW/CCW3 (step S16) and outputs an enabling signal through the enabling signal output terminal ENB3 (step S17).

Upon receipt of the rotating direction signal CW3 and the enabling signal, the third motor driver 5c rotates the transverse position adjustment pulse motor PM3 in the clockwise direction until the key 24c is released. When the key 24c is released (when the answer to the question in step S18 is YES), the enabling signal is made ineffective and the transverse position adjustment pulse motor PM3 is stopped. (step S19)

The amount of adjustment in the transverse direction is shown by the LED display 25 and is stored in the MPU 1.

When one of the centering keys 20b and 24b is pushed (when the answer to the question in step S1 is NO, the answer to the question in step S2 is NO, and the answer to the question in step S3 is YES), it is determined whether the centering key 20b for centering the printing position in the longitudinal direction has been pushed. (step S21) When it is determined that the key 20b has been pushed (when the answer to the question instep S21 is YES), the MPU 1 controls the longitudinal position adjustment pulse motor PM2 to center the printing position in the longitudinal direction. (step S22) That is, the MPU 1 stores therein the current printing position in the longitudinal direction and outputs a rotating direction signal CW2 or CCW2, an enabling signal, and clock pulses to the second motor driver 5b so that the printing position is centered in the longitudinal direction.

When it is determined that the key 24b has been pushed (when the answer to the question in step S21 is NO), the MPU 1 controls the transverse position adjustment pulse motor PM3 to center the printing position in the transverse direction. (step S24) That is, the MPU 1 stores therein the current printing position in the transverse direction and outputs a rotating direction signal CW3 or CCW3, an enabling signal, and clock pulses to the third motor driver 5c so that the printing position is centered in the transverse direction.

The processing described above is repeatedly executed as interruption processing while the power source of the stencil printer 10 is on.

Though, in the embodiment described above, the pulse motors PM2 and PM3 are controlled in exclusive control mode, the pulse motors PM2 and PM3 may be simultaneously driven. In such a case, clock pulses of the same frequency are supplied to the pulse motors PM2 and PM3, and they are rotated at the same speed so long as they are of the same type.

In this case, the printing position is adjusted in both the longitudinal and transverse directions at one time. However since the mechanisms driven by the pulse motors PM2 and PM3 are different from each other, there arises no problem.

Though, in the third embodiment described above, the motor control system of the present invention is applied to a stencil printer as an image forming apparatus, the image forming apparatus need not be limited to the stencil printer.

Further, though, in the embodiments described above, pulse motors are employed, electric motors other than pulse motors may be employed. For example, in the case of the first embodiment, where the motors are driven in a constant-voltage mode, DC motors can be employed.

Further, as the means for generating clock pulses inside the MPU 1, various means other than the integrated timer controller ITC may be used.

As can be understood from the description above, in the motor control system of the present invention, clock pulses output through a single channel of the processor are used in common by a plurality of motors, and accordingly, more motors than the number of the available channels of the timer controller can be controlled by the processor.

The motors which use in common clock pulses from a single channel may be either those to be driven at one time or those to be driven separately. Whether the motors which use in common clock pulses from a single channel are driven at one time or separately from each other can be controlled on the side of the processor. Further the motors can be driven either in the constant-voltage drive mode or the constant-current drive mode according to the type of the motors and the like.

In an image forming apparatus, a predetermined number of channels of the integrated timer controller ITC of the processor have been allotted to each function. Even if the number of motors to be controlled by the predetermined number of channels becomes larger than the predetermined number, all the motors can be controlled without an additional integrated timer controller ITC by use of the motor control system of the present invention. Since no additional integrated timer controller ITC is required, space for increased integrated timer controllers is unnecessary and increase in cost can be suppressed.

What is claimed is:

1. A motor control system comprising:
a processor having a clock output terminal for outputting clock pulses in desired cycles,
a plurality of motors, and
a plurality of motor drivers which are provided one for each motor and drive the corresponding motors on the basis of the clock pulses input into the motor drivers through respective clock input terminals,
wherein the clock input terminals of the motor drivers are connected to the clock output terminal of the processor in common with each other with each of said plurality of motor drivers driving respective motors independently of one another upon receiving a common clock pulse from the processor.

2. A motor control system as defined in claim 1 in which the processor outputs an enabling signal exclusively to one of the motor drivers, thereby enabling said one motor driver to start driving the corresponding motor.

3. A motor control system as defined in claim 1 in which the processor outputs an enabling signal to two or more of the motor drivers at one time, thereby enabling the motor drivers to start driving the corresponding motors.

4. A motor control system comprising:
a processor having first and second clock output terminals and a plurality of enabling signal output terminals, the first and second clock output terminals outputting first and second clock pulses in desired cycles and in phases different from each other by a predetermined amount,
a plurality of motors, and
a plurality of motor drivers which are provided one for each motor and drive the corresponding motors in a constant-voltage drive mode on the basis of the first and second clock pulses input into the motor drivers from the first and second clock output terminals through first and second clock input terminals of each of the motor drivers and the enabling signals selectively input into the motor drivers through the enabling signal output terminals of the processor,
wherein the first clock input terminals of the motor drivers are connected to the first clock output terminal of the processor in common with each other, and the second clock input terminals of the motor drivers are connected to the second clock output terminal of the processor in common with each other.

5. A motor control system comprising:
a processor having a clock output terminal, a plurality of enabling signal output terminals, and a plurality of rotating direction signal output terminals, the clock output terminal outputting clock pulses in desired cycles,
a plurality of motors, and
a plurality of motor drivers which are provided one for each motor and drive the corresponding motors in a constant-current drive mode on the basis of the clock pulses input into the motor drivers from the clock output terminals through a clock input terminal of each of the motor drivers and the enabling signals and the rotating direction output signals selectively input into the motor drivers respectively through the enabling signal output terminals and the rotating direction output terminals of the processor,
wherein the clock input terminals of the motor drivers are connected to the clock output terminal of the processor in common with each other with each of said plurality of motor drivers driving respective motors independently of one another upon receiving a common clock pulse from the processor.

6. An image forming apparatus which is for forming an image on a printing paper and is provided with a plurality of motors and a motor control system for controlling the motors, the motor control system comprising
a processor having a clock output terminal for outputting clock pulses in desired cycles, and
a plurality of motor drivers which are provided one for each motor and drive the corresponding motors on the basis of the clock pulses input into the motor drivers through respective clock input terminals,
wherein the clock input terminals of the motor drivers are connected to the clock output terminal of the processor in common with each other with each of said plurality of motor drivers driving respective motors independently of one another upon receiving a common clock pulse from the processor.

7. An image forming apparatus which is for forming an image on a printing paper and is provided with a plurality of motors and a motor control system for controlling the motors, the motor control system comprising a processor having a clock output terminal for outputting clock pulses in desired cycles, and a plurality of motor drivers which are provided one for each motor and drive the corresponding motors on the basis of the clock pulses input into the motor drivers through respective clock input terminals, wherein the clock input terminals of the motor drivers are connected to the clock output terminal of the processor in common with each other, and the motors are those for adjusting the position on the printing paper in which the image is to be formed.

* * * * *